(12) United States Patent
Shafak et al.

(10) Patent No.: US 12,444,899 B2
(45) Date of Patent: Oct. 14, 2025

(54) METHOD AND APPARATUS FOR CONTROLLING A PULSE REPETITION RATE OF A PULSED LASER BEAM, AND PULSED LASER OSCILLATOR WITH STABILIZED PULSE REPETITION RATE

(71) Applicants: Deutsches Elektronen-Synchrotron DESY, Hamburg (DE); Cycle GmbH, Hamburg (DE)

(72) Inventors: Kemal Shafak, Hamburg (DE); Dai Anan, Hamburg (DE); Franz Xaver Kaertner, Hamburg (DE)

(73) Assignees: Cycle GmbH, Hamburg (DE); Deutsches Elektronen-Synchroton DESY, Hamburg (DE)

( * ) Notice: Subject to any disclaimer, the term of this patent is extended or adjusted under 35 U.S.C. 154(b) by 793 days.

(21) Appl. No.: 17/731,233

(22) Filed: Apr. 27, 2022

(65) Prior Publication Data
US 2022/0352687 A1 Nov. 3, 2022

(30) Foreign Application Priority Data
Apr. 29, 2021 (EP) .................................... 21171191

(51) Int. Cl.
*H01S 3/10* (2006.01)
*H01S 3/06* (2006.01)
(Continued)

(52) U.S. Cl.
CPC ........ *H01S 3/10046* (2013.01); *H01S 3/0602* (2013.01); *H01S 3/1307* (2013.01); *H01S 3/1305* (2013.01); *H01S 3/136* (2013.01)

(58) Field of Classification Search
CPC .. H01S 3/10046; H01S 3/1305; H01S 3/1307; H01S 3/136
See application file for complete search history.

(56) References Cited

U.S. PATENT DOCUMENTS 5,367,529 A * 11/1994 Holsinger ............. H01S 3/2383
372/38.1
5,929,430 A 7/1999 Yao et al.
(Continued)

OTHER PUBLICATIONS

Bartels et al. (2005). Femtosecond-laser-based synthesis of ultrastable microwave signals from optical frequency references. Optics Letters, 30(6), 667-669.
(Continued)

*Primary Examiner* — Michael Carter
(74) *Attorney, Agent, or Firm* — Caesar Rivise, PC

(57) ABSTRACT

A method is disclosed for controlling a pulse repetition rate of pulsed laser beam 1 created by pulsed laser oscillator 100, includes generating beam 1 by oscillator 100, splitting beam 1 into first pulsed split beam 1a and second pulsed split beam 1b, time-delaying split beam 1a relative to split beam 1b by optical delay device 220, generating timing baseband signal Sc including a timing jitter of the pulse repetition rate based on split beam 1a and second split beam 1b by timing detector device 230, generating feedback signal Sf based on timing baseband signal Sc, and applying feedback signal Sf on oscillator 100 and controlling the pulse repetition rate of beam 1 based on the feedback signal Sf. Furthermore, repetition rate control apparatus 200 for controlling a pulse repetition rate of pulsed laser oscillator 100 and pulsed laser oscillator 100, comprising repetition rate control apparatus 200 are described.

20 Claims, 5 Drawing Sheets

(51) Int. Cl.
*H01S 3/13* (2006.01)
*H01S 3/136* (2006.01)

(56) References Cited

U.S. PATENT DOCUMENTS

| | | | | |
|---|---|---|---|---|
| 5,999,545 | A * | 12/1999 | Jeon | H01S 3/067 372/18 |
| 7,397,567 | B2 | 7/2008 | Kaertner et al. | |
| 7,940,390 | B2 * | 5/2011 | Kaertner | G01J 11/00 356/229 |
| 8,976,822 | B2 | 3/2015 | Maleki et al. | |
| 10,158,208 | B2 * | 12/2018 | Kim | H01S 3/10053 |
| 2011/0134943 | A1 | 6/2011 | Hartl et al. | |

OTHER PUBLICATIONS

Fortier et al. (2011). Generation of ultrastable microwaves via optical frequency division. Nature Photonics, 5, 425-429.

Jung et al. (2015). All-fibre photonic signal generator for attosecond timing and ultralow-noise microwave. Scientific Reports, 1-7.

Kim et al. (2007). Attosecond-resolution timing jitter characterization of free-running mode-locked lasers. Optics Letters, 32(24), 3519-3521.

Kwon et al. (2017). All-fiber interferometer-based repetition-rate stabilization of mode-locked lasers to 10-14-level frequency instability and 1-fs-level jitter over 1 s. Optics Letters, 42(24), 5186-5189.

Kwon et al. (2017). Reference-free, high-resolution measurement method of timing jitter spectra of optical frequency combs. Scientific Reports, 1-9.

Wei et al. (2018). All-fiber-photonics-based ultralow-noise agile frequency synthesizer for X-band radars. Photonics Research, 6(1), 12-17.

Yao et al. (1996). Optoelectronic microwave oscillator. Optical Society of America, 13(8), 1725-1735.

Extended European Search Report dated Oct. 27, 2021 for EP 21171191.6.

* cited by examiner

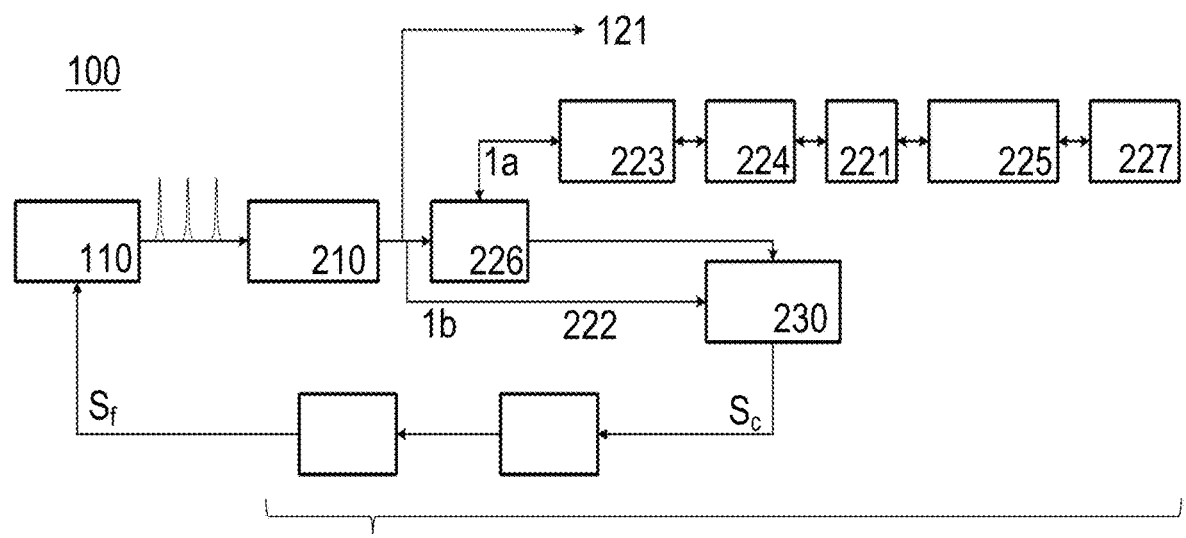
FIG. 9
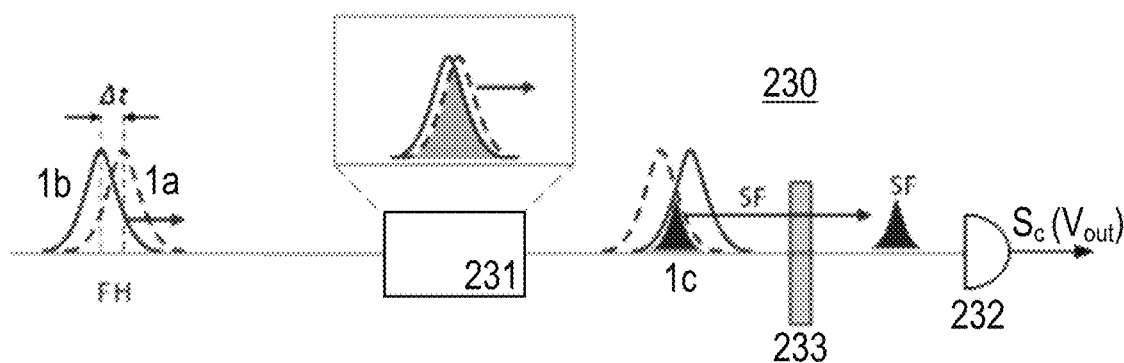
FIG. 10
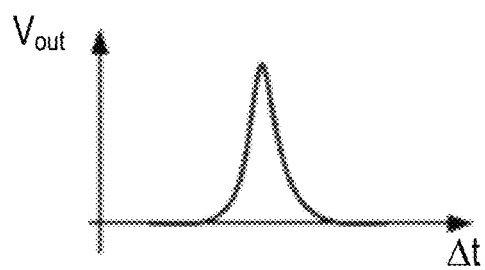

METHOD AND APPARATUS FOR CONTROLLING A PULSE REPETITION RATE OF A PULSED LASER BEAM, AND PULSED LASER OSCILLATOR WITH STABILIZED PULSE REPETITION RATE

CROSS-REFERENCE TO RELATED APPLICATIONS

This application claims priority to EP 21171191.6, filed Apr. 29, 2021, the contents of which are incorporated herein by reference in their entireties for all purposes.

FIELD OF THE INVENTION

The invention relates to a method of controlling a pulse repetition rate of a pulsed laser beam created by a pulsed laser oscillator. Furthermore, the invention relates to a repetition rate control apparatus being configured for controlling a pulse repetition rate of a pulsed laser oscillator, and to a pulsed laser oscillator comprising the repetition rate control apparatus. Applications of the invention are available in the fields of light-based measuring techniques, like spectroscopy, photonic components, time-of-flight (TOF) measurements, and/or operating x-ray free electron lasers.

RELATED ART

In the Present Specification, Reference is Made to the Following Related Art Illustrating the Technical Background of the Invention:
[1] K. Jung et al. in "Scientific reports" 5.1 (2015): 1-7;
[2] D. Kwon et al. in "Scientific reports" 7.1 (2017): 1-9;
[3] D. Kwon et al. in "Optics letters" 42.24 (2017): 5186-5189;
[4] J. Wei et al. in "Photonics Research" 6.1 (2018): 12-17;
[5] U.S. Pat. No. 10,158,208 B2;
[6] J. Kim et al. in "Optics letters" 32.24 (2007): 3519-3521;
[7] A. Bartels et al. in "Optics letters" 30.6 (2005): 667-669;
[8] T. M. Fortier et al. in "Nature Photonics" 5.7 (2011): 425;
[9] X. S. Yao et al. in "JOSA" B 13.8 (1996): 1725-1735;
[10] U.S. Pat. No. 5,929,430;
[11] U.S. Pat. No. 8,976,822 B2;
[12] US 2011/0134943 A1;
[13] U.S. Pat. No. 7,397,567 B2; and
[14] U.S. Pat. No. 7,940,390 B2.

The timing jitter of an optical pulse train (or: phase noise of its pulse repetition rate) generated by a pulsed laser oscillator can be measured by splitting the output of the same pulsed laser oscillator into two paths, delaying any of the two paths photonically with respect to the other (e.g., by using an optical fiber) and then combining and comparing the two signal paths with each other. Previous techniques (see e. g. [1] to [5]) use interference of just two optical frequencies contained in the entire optical spectrum of the optical pulse train containing thousands of optical frequencies in order to detect timing jitter of the optical pulse train. Therefore, just two target optical frequencies are filtered narrowly, hence, by sacrificing from optical signal level delivered by the pulse train. Furthermore, such interferometric techniques need a broad optical bandwidth to achieve high noise detection sensitivity, and complicated electronics requiring external acousto-optical or electro-optical modulators to separate and retrieve the phase noise of the pulse repetition rate from other noise sources. Furthermore, they are susceptible to higher noise floor due to back scattering of optical frequencies in optical fiber and relative intensity noise of the laser source.

As an alternative to the above interferometric techniques, it is demonstrated in [6] that the timing jitter of an optical pulse train generated by a pulsed laser oscillator using a photonic delay line can be sensed by an optical intensity cross correlation. However, while describing the occurrence of the timing jitter and the capability of measuring it, [6] does not teach a measure for suppressing the laser oscillator's noise. Thus, there is still a need for a technique which can measure and suppress the phase noise of the repetition rate of an optical pulse train generated by a pulsed laser oscillator, while avoiding the limitations of the interferometric techniques.

Suppression of the pulse timing jitter is required in particular in the field of generating microwaves. In frequency domain, an optical pulse train can be described as an optical frequency comb comprising a plurality of frequency components with a frequency spacing equal to the repetition rate of the optical pulse train. With a selected repetition rate, the frequency spacing is just in the microwave frequency range. It is generally known that microwave frequency signals can be extracted from an optical frequency comb by optical frequency division (OFD), see [7] and [8]. Due to the relation of the microwave frequency to the repetition rate, generating stable microwaves also requires stabilization of the pulse noise. As a main limitation, conventional OFD setups are bulky and expensive.

As a further related technique, optoelectronic microwave oscillators have been described in [9] to [12], wherein a cw laser output is modulated by a microwave, optically delayed with a fiber link, detected with a photodiode and compared to not-delayed, microwave-modulated output. With this technique, ultrastable, spectrally pure microwave reference signals can be created. This technique is restricted to the stabilization of microwave frequency modulated cw lasers.

Objective of the Invention

The objective of the invention is to provide an improved method for controlling a pulse repetition rate of a pulsed laser beam, an improved repetition rate control apparatus for controlling a pulse repetition rate of a pulsed laser beam and/or an improved stabilized pulsed laser oscillator, avoiding the disadvantages of conventional techniques. In particular, controlling the pulse repetition rate is to be obtained with improved precision, reduced phase noise of the pulse repetition rate, improved suppression of other noise sources, reduced dependency on intensity noise of the laser oscillator and/or avoiding effects of back scattering of optical frequencies in an optical fiber.

SUMMARY OF THE INVENTION

These objectives are correspondingly solved by a method and a repetition rate control apparatus for controlling a pulse repetition rate of a pulsed laser beam and by a pulsed laser oscillator of the invention.

According to a first general aspect of the invention, the above objective is solved by a method for controlling a pulse repetition rate of a pulsed laser beam created by a pulsed laser oscillator, comprising the steps of generating the pulsed laser beam by the pulsed laser oscillator, splitting the pulsed laser beam into a first pulsed split beam and a second pulsed split beam, time-delaying the first pulsed split beam relative to the second pulsed split beam by an optical delay device, generating a timing baseband signal based on the time-delayed first pulsed split beam and the second pulsed split beam by a timing detector device, generating a feedback signal based on the timing baseband signal, preferably by a feedback generation circuit, and applying the feedback signal on the pulsed laser oscillator and controlling the pulse repetition rate of the pulsed laser beam based on the feedback signal.

According to a second general aspect of the invention, the above objective is solved by a repetition rate control apparatus being configured for controlling a pulse repetition rate of a pulsed laser oscillator, comprising a beam splitter device being configured for splitting a pulsed laser beam into a first pulsed split beam and second pulsed split beam, an optical delay system being configured for time-delaying the first pulsed split beam relative to the second pulsed split beam, a timing detector device being configured for generating a timing baseband signal based on the time-delayed first pulsed split beam and the second pulsed split beam, and a feedback generation circuit for generating a feedback signal based on the baseband signal, wherein the feedback signal is capable of controlling the pulse repetition rate of the pulsed laser beam. Preferably, the repetition rate control apparatus or an embodiment thereof is configured for executing the method according to the first general aspect of the invention or an embodiment thereof.

According to a third general aspect of the invention, the above objective is solved by a pulsed laser oscillator comprising a repetition rate control device according to the second general aspect of the invention or an embodiment thereof. According to preferred applications of the invention, the pulsed laser oscillator comprises a laser extractor, configured to output the pulsed laser beam and/or a microwave extractor, configured to convert the pulsed laser beam in a microwave beam.

The pulsed laser oscillator (or: laser oscillator apparatus) is any laser apparatus for creating at least one sequence of optical pulses (laser pulses, pulsed laser beam) with a predetermined pulse repetition rate and pulse duration, and with a predetermined pulse intensity. The pulsed laser oscillator includes a laser source device and components thereof. Optionally, the pulsed laser oscillator further includes optical components for manipulating the optical pulses, e. g. by amplification, modulation, compression and/or stretching.

The output of the laser source device is split to the first and second pulsed split beams. Splitting the pulsed laser beam preferably is obtained by a beam splitter device. Particularly preferred, the beam splitter device is arranged downstream of the laser source device, e. g. as a part of the laser extractor. Alternatively, if the laser source device has a configuration such that an output of the laser source device comprises two or more pulsed laser beams with a common repetition rate, two of the pulsed laser beams can be employed as the first and second pulsed split beams. In this case, the beam splitter device is considered to be a part of the laser source device providing the two or more pulsed laser beams. In other words, "splitting" a pulsed laser beam into the first and second pulsed split beams comprises generating one pulsed laser beam and creating the first and second pulsed split beams therefrom or generating two pulsed laser beams with the same pulse repetition rate with one laser source device, thus providing the first and second pulsed split beams.

The term "timing detector device" generally refers to a device that is configured for providing an output signal (i. e. the timing baseband signal) that is determined by intensities of the time-delayed first pulsed split beam and the second pulsed split beam and the mutual temporal relationship thereof. In particular, the timing detector device is a correlation detector that is adapted for creating the timing baseband signal as an autocorrelation function of the pulsed laser beam being initially created by the pulsed laser oscillator. Contrary to the conventional interference based technique, the invention uses signal generation based on optical pulse transmission rather than optical wave transmission and a detection based on correlation sensing rather than wave interference.

Advantageously, the present inventors have found that the output signal of the timing detector device can be used not only for measuring the timing jitter (as shown in [6]), but also for suppressing it by the feedback control. By employing the optical pulse train itself and hence the complete optical spectrum instead of filtering out few optical frequencies from it, the phase noise of the repetition rate of an optical pulse train generated by a pulsed laser oscillator can be suppressed in an efficient and precise manner.

The present invention provides a self-referenced ultra-low noise pulsed laser oscillator whose pulse repetition rate is referenced (or locked) to a photonically-delayed version of its output optical pulse train by using a feedback loop whose pulse timing detector device is an intensity cross correlator. The correlator employs the optical pulse train itself, and is able to measure just the pulse timing jitter, providing higher signal to noise ratio and not susceptible to neither back scattering nor relative intensity noise. Therefore, once the feedback signal is applied, the inherent noise of the pulsed laser will be decreased more efficiently when compared to the interferometric techniques.

In particular, the timing baseband signal is created by the intensity correlation of the first and second pulsed split beam intensities rather than by interference of light fields. Consequently, the timing baseband signal represents purely the timing jitter of the optical pulses. As further advantages over prior art, the application of the invention is not limited by photodetector characteristics, the timing baseband signal is created with reduced noise floor and improved signal to noise ratio, and there is no need for synchronous detection to detect the pulse repetition rate. The repetition rate control is obtained with reduced device complexity as there is no external modulator required, no heterodyning (hence, no Fiber Bragg Grating) required, and both electronic and optical type timing detection can be employed for generating the timing baseband signal. Advantageously, compared with the conventional interference based detection, the invention requires less and simpler electronics and optics.

As a further advantage, the invention provides various applications. In particular, by tapping off some portion of the self-referenced pulsed laser, one can obtain an ultralow jitter optical pulse train or an ultralow phase noise microwave signal source by extracting a microwave from the optical pulse train using a photodetection setup.

Applying the feedback signal on the pulsed laser oscillator comprises driving an adjusting portion of the pulsed laser oscillator directly with the feedback signal, or with a control signal derived from the feedback signal. According to a preferred embodiment of the invention, the pulsed laser oscillator includes a piezoelectric transducer for adjusting a resonator length of a resonator included in the pulsed laser oscillator, in particular a resonator length of the laser source device included in the pulsed laser oscillator, and the pulse repetition rate of the pulsed laser beam is controlled by providing the feedback signal or the control signal derived therefrom for the piezoelectric transducer and adjusting the resonator length in dependency on the feedback signal or the control signal. The piezoelectric transducer employed as the adjusting portion is a mechanical drive being connected with at least one section, e. g. mirror, of the laser source device. The mechanical drive is configured for providing an adjustment movement of the at least one section, wherein the distance covered by the adjustment movement preferably is determined by at least one of an amplitude and a duration of the feedback signal. Advantageously, the laser source device can be directly and instantaneously adjusted with via the piezoelectric transducer receiving the feedback signal or the control signal.

According to a further preferred embodiment of the invention, the pulsed laser oscillator includes an optical modulator, in particular an electro-optic modulator, for adjusting at least one of a phase, amplitude and polarization of light within the pulsed laser oscillator, and the pulse repetition rate of the pulsed laser beam is controlled by providing the feedback signal for the optical modulator and adjusting the at least one of the phase, amplitude and polarization in dependency on the feedback signal or the control signal derived therefrom. The optical modulator employed as the adjusting portion is an internal modulator being included in the pulsed laser oscillator and coupled with the laser source device. Feedback-controlling the optical modulator has advantages in terms of providing additional degrees of freedom for adjusting the optical pulses and the repetition rate thereof.

Basically, the invention can be implemented with a fixed temporal delay between the first and second pulsed split beams, resulting in advantages for the configuration of the optical delay device. Alternatively, according to a preferred embodiment of the invention, the optical delay device includes a variable delay stage which introduces a time delay that effects both of the first and second pulsed split beams through the feedback signal Sf applied on the pulsed laser oscillator, wherein the pulse repetition rate of the pulsed laser beam is set by changing the optical delay provided by the variable delay stage which in turn changes the feedback signal applied to set the pulse repetition rate. With the variable delay stage, the time delay between the first and second pulsed split beams can be changed, resulting in a change of the pulse repetition rate. Advantageously, the variable delay stage offers yet a further possibility of controlling the pulsed laser beam.

In particular, the variable delay stage introduces a time delay to the first pulsed split beam only when there is no feedback signal applied on the pulsed laser oscillator, while on the other hand, when the feedback signal is activated, the delay introduced by the variable delay stage effects both split optical pulse trains together through the feedback signal applied on the pulsed laser oscillator. For explaining the delay effect when the feedback loop is activated, the long-optical path (long delay arm) guiding the first pulsed split beam can be considered as an external resonator with a certain length. The first pulsed split beam is coupled in here e. g. for multiple travels (>1, typically 2-way travel, see below). After this resonator, the first pulsed split beam can be considered as a reference signal in the timing detector where the relative timing jitter of the second pulsed split beam is measured with respect to the first pulsed split beam. If there was no moveable element in the delay, e.g., length-fixed fiber, then the pulse repetition rate will be also fixed and not tunable because the intracavity tuning elements of the laser are already employed by the feedback system.

Furthermore, when the delay stage is moved in a locked state, the introduced delay changes the length of the external resonator provided by the long delay arm and since the two pulsed split beams are locked, i.e., synchronous, this forces the laser resonator length to change due to the feedback signal. Therefore, this allows a degree of freedom outside the cavity to control the pulse repetition rate of the laser. Otherwise, when the system is "unlocked" (no feedback signal applied), the delay introduced by a variable delay stage just changes the delay of the first pulsed split beam and hence causes a relative delay with respect to the second pulsed split beam.

As a further advantage, various types of variable delay stages are available, in particular for setting the pulse repetition rate. According to preferred embodiments of the invention, the variable delay stage comprises at least one of at least one mirror on a, preferably motor-driven, translation stage, a fiber stretcher, an optical modulator, preferably an electro-optic modulator or an acoustic optic modulator, and a variable delay element on chip inscribed in a waveguide.

Further embodiments of the invention are characterized by the type of the timing detector device. According to a first preferred variant, the timing detector device comprises at least two photodetectors and an electronic mixer. Thus, the timing detector device is an electronic cross correlator, including the photodetectors, each for sensing one of the first and second pulsed split beams, and an electronic correlator device. In this case, the timing baseband signal is an electronic cross-correlation baseband signal that is created with the electronic correlator device from outputs of the photodetectors. Particularly preferred, the electronic correlator device comprises a multiplication unit being configured for multiplying the outputs of the photodetectors and providing the timing baseband signal based on the product of the intensities of the first and second pulsed split beams. The electronic cross correlator has advantages in terms of relatively simple configuration.

Alternatively or additionally, the timing detector device is an optical cross correlator. The optical cross correlator preferably includes an optical nonlinear crystal, wherein the timing baseband signal is created by a superposition and non-linear interaction of the first and second pulsed split beams in the optical nonlinear crystal. A response signal of the optical nonlinear crystal is sensed with at least one photodetector. In this case, the timing baseband signal is an optical cross-correlation baseband signal of the first and second pulsed split beams, based on an output signal of the photodetector. The optical cross correlator has advantages in terms of compact configuration and high sensitivity.

Preferably, the optical cross correlator is a balanced optical cross correlator wherein the timing detector device may comprise a sum frequency generating, non-linear crystal and at least two photodetectors. Furthermore, the optical cross correlator preferably is inscribed in a waveguide. Advantageously, this provides a compact structure of the timing detector device.

According to another preferred feature, the timing detector device is configured to generate a timing baseband signal value of 0 when a pulse of the first pulsed split beam and a pulse of the second pulsed split beam exactly overlap in time. Advantageously, this embodiment facilitates the generation of the feedback signal and controlling the pulse repetition rate of the pulsed laser beam.

According to a further preferred embodiment of the invention, the optical delay system comprises a first optical path having a first path length, l1, and a second optical path having a second path length, l2, wherein the first pulsed split beam is guided along the first optical path and the second pulsed split beam is guided along the second optical path, and the first path length l1 is longer than the second path length l2. Advantageously, the longer first path length facilitates the adjustment of the time-delaying the first pulsed split beam relative to the second pulsed split beam. With advantageous examples, the first path length l1 is more than 100 m, preferably more than 1 km, particular preferred more than 7 km, longer than the second path length l2. Advantageously, multiple configurations of the first optical path are available, comprising e. g. at least one of a, preferably dispersion compensated, optical fiber, preferably a gyroscope fiber, with a length equal to or above the first path length, a multiple-reflection delay line member comprising at least two mirror elements, a waveguide based delay on a chip, an optical amplifier, preferably an Erbium-doped fiber amplifier, a dispersion compensation element, preferably fiber Bragg grating, and a reflector, preferably a Faraday rotating mirror. Employing the optical fiber or the optical amplifier has advantages in terms of avoiding distortions of the first pulsed split beam. Advantages of the multiple-reflection delay line or the waveguide result from the compact structure thereof.

According to a further advantageous embodiment of the invention, the step of generating the feedback signal comprises passing the baseband signal through a loop filter (e.g., a PID controller), wherein the timing baseband signal preferably is generated within a linear regime near a zero-point crossing of the timing detector device. With this embodiment, particular advantages for a feedback control with low complexity are obtained. As a further advantage, the timing baseband signal does not require an external reference to generate the necessary feedback signal. It can be easily used for feedback after processing by the loop filter.

Preferably, the method uses only light of the pulsed laser oscillator for controlling the pulse repetition rate and/or the method does not use light of any additional pulsed laser oscillator for controlling the pulse repetition rate. Thus, additional noise sources can be avoided in an advantageous manner. Alternatively or additionally, the method preferably involves no filtering of the generated pulsed laser beam for controlling the pulse repetition rate and/or uses the complete frequency spectrum of the generated pulsed laser beam. Accordingly, limitations resulting from sensing single frequency components as employed with the conventional interferometric techniques are avoided.

Advantageously, multiple types of the pulsed laser oscillators are available. With preferred examples, the pulsed laser oscillator is a pulsed femtosecond laser oscillator and/or a mode-locked laser. Additionally or alternatively, the pulsed laser beam preferably comprises a, particularly preferred periodic, pulse train and/or the pulse repetition rate of the pulsed laser oscillator is in the radio frequency range or microwave frequency range.

Preferred application areas of the present invention comprise at least one of timing distribution and synchronization of x-ray free electron lasers, generation of ultra-low phase noise microwave signals, dual comb spectroscopy, photonics based radars, photonic analog-to-digital converters, ultrafast electron diffraction, time and frequency transfer, and time-of-flight-based sensing and ranging.

Features disclosed in the context of the method of controlling a pulse repetition rate and the embodiments thereof also represent preferred features of the inventive repetition rate control apparatus and/or pulsed laser oscillator and the embodiments thereof, and vice versa. The aforementioned aspects and inventive and preferred features, in particular with regard to the configuration of the method of controlling the pulse repetition rate as well as the dimensions and compositions of individual components which have been described in relation to the method of controlling the pulse repetition rate, therefore also apply for the repetition rate control apparatus and/or pulsed laser oscillator. The preferred embodiments, variants and features of the invention described above are combinable with one another as desired.

BRIEF DESCRIPTION OF THE DRAWINGS

Further details and advantages of the invention are described in the following with reference to the attached drawings, which schematically show in:

FIGS. 8 and 9: detailed illustrations of further embodiments of the invention; and FIGS. 10 to 12: embodiments of cross-correlation detection with a timing detector device.

PREFERRED EMBODIMENTS OF THE INVENTION

Features of preferred embodiments of the invention are described in the following with exemplary reference to embodiments, wherein first and second pulsed split beams are obtained by splitting an output pulsed laser beam of a laser source device. If a laser source device with two output laser beams is used, the invention can be implemented in a corresponding manner by employing the two output laser beams as the first and second pulsed split beams. Furthermore, reference is made in an exemplary manner to optical cross-correlation based detection of the delay between the split beams. The invention can be implemented in a corresponding manner by employing an electronic cross-correlation based detection. It is emphasized that the implementation of the invention in practice is not restricted to the particular components, configurations, parameters and processes, which can be varied in dependency on the application conditions of the invention.

Figure 1:
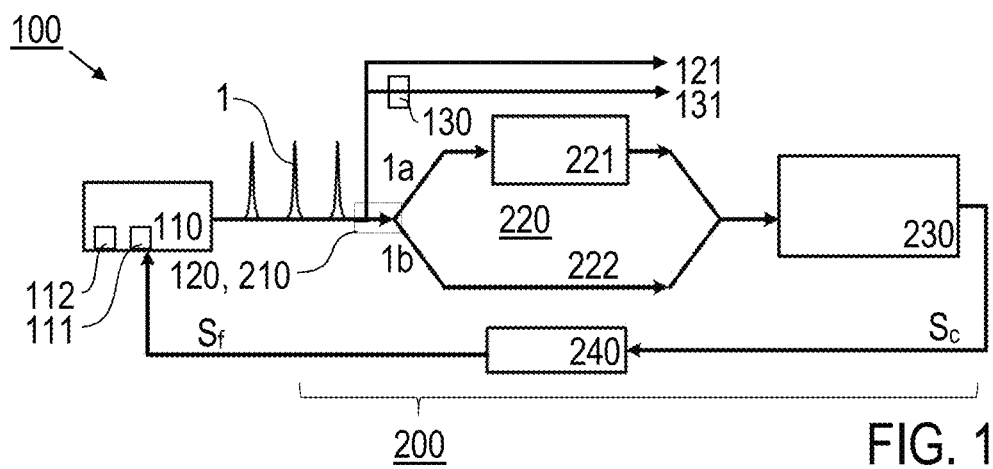
FIG. 1: an illustration of features of preferred embodiments of the invention.
Figure 3:
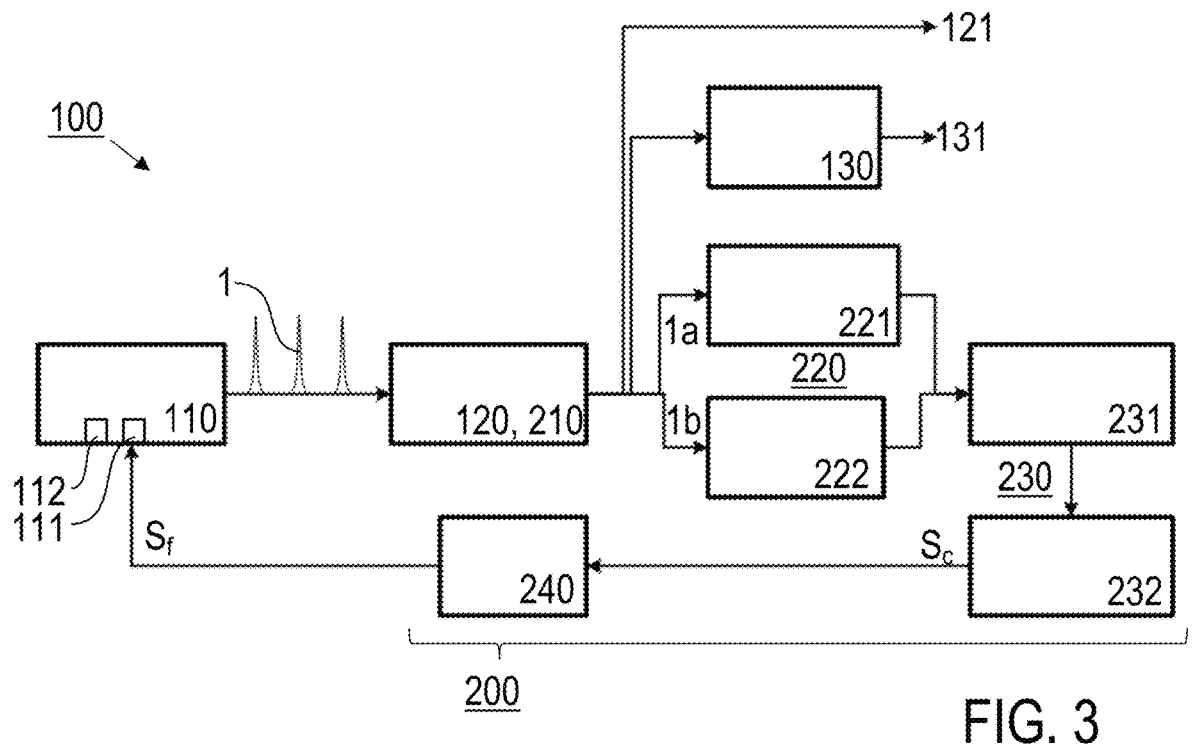
FIG. 3: an illustration of further embodiments of the invention.

FIGS. 1 and 3 schematically show a pulsed laser oscillator 100 that is provided with a repetition rate control apparatus 200. The pulsed laser oscillator 100 comprises a laser source device 110 creating a pulsed laser beam 1, the repetition rate control apparatus 200 stabilizing the repetition rate of the pulsed laser beam 1 and at least one of a laser extractor 120 for coupling the pulsed laser beam 1 out of the pulsed laser oscillator 100 and a microwave extractor 130 for converting the pulsed laser beam 1 in a microwave beam 2.

The laser source device 110 is e. g. a femtosecond laser (pulse durations in a range from e. g. 10 fs to 10 000 fs, repetition rate in a rate from 100 kHz to 30 GHz, like a solid state mode locked laser, a fiber mode locked laser, a Semiconductor Saturable Absorber Mirror (SESAM) mode-locked laser, a fiber laser with nonlinear amplifying loop mirror (NALM), a fiber laser with nonlinear optical loop mirror (NOLM), a nonlinear polarization rotation (NPR) mode locked fiber laser or an all-normal-dispersion femtosecond fiber laser. With a practical example, the laser source device 110 is an ultrafast femtosecond laser (manufacturer: Menhir Photonics AG, Switzerland). The laser source device 110 includes a laser resonator (not shown) with a variable resonator length. A piezoelectric transducer 111 is coupled with the laser resonator, e. g. a resonator mirror or a fiber section thereof, for adjusting the repetition rate via the resonator length of the laser resonator. Furthermore, the laser source device 110 may include an optical modulator 112, like an electro-optic modulator, for adjusting at least one of a phase, amplitude and polarization of the pulsed laser beam 1.

The repetition rate control apparatus 200 comprises a beam splitter device 210, an optical delay system 220, a timing detector device 230 and a feedback generation circuit 240 (also called loop filter), as described in the following.

The beam splitter device 210 is configured for splitting the pulsed laser beam 1 into a first pulsed split beam 1a and second pulsed split beam 1b. To this end, the beam splitter device 210 includes an optical splitter, optionally being combined with an optical coupler. For example, the optical splitter is a free-space optical splitter with glass cubes or plates, a polarization beam splitter, a halfwave plate beam splitting combination, a fiber optic splitter, and/or a waveguide based optical splitter. The simplest free space beam splitter is a combination of half wave plate and polarization beam splitter (PBS) cube. The halfwave plate before the PBS rotates the polarization vector of the input light which in turn changes the splitting ratio between the outputs if the PBS. As mentioned above, some lasers have multiple outputs which are divided inside the laser. In that case, the beam splitter device is part of the laser source device and a separate beam splitter device is not provided.

The optical delay system 220 is arranged for time-delaying the first pulsed split beam 1a relative to the second pulsed split beam 1b. To this end, the optical delay system 220 is configured with first and second optical paths 221, 222, wherein the first and second pulsed split beams 1a, 1b are guided along the first and second optical paths 221, 222, resp.

The first optical path 221 (also called long-optical path) has a first path length l1 that could be as long as possible, even 100 km, but typically between 100 meters and 20 km. The first optical path 221 may be provided by an optical waveguide, like an optical fiber, and/or a free space optical path, e. g. a folded beam path employing folding mirrors. With preferred practical examples, it could be an optical fiber spool, and/or a fiber optic gyroscope coil. When an optical fiber is employed, a dispersion compensating element can be provided at an output end of the optical fiber for compressing the optical pulse stretched in the optical fiber (see FIGS. 8, 9). The dispersion compensating element may comprise e. g. another fiber with opposite dispersion properties, at least one fiber Bragg grating, and/or a grating or prism pair.

Figure 8:
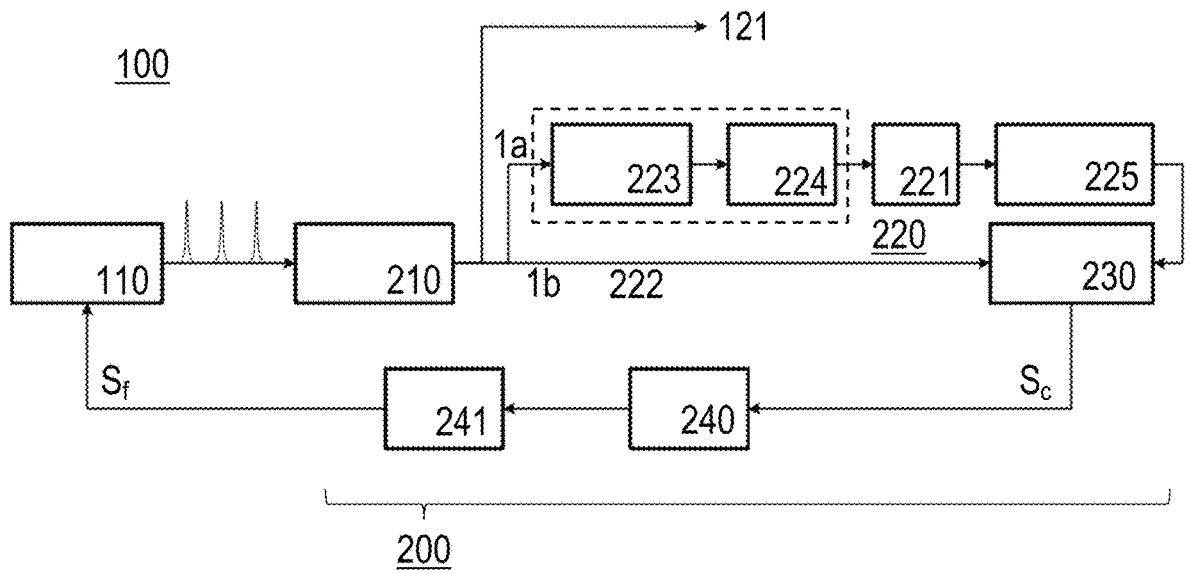

A variable optical delay device, an electro optical modulator (EOM) and/or an acousto optical modulator (AOM) may be provided in the first optical path 221 (see FIG. 8). It can also contain an optical power amplifying element, such as Erbium-doped-fiber amplifier (EDFA).

The second optical path 222 (also called short optical path) has a second path length l2 that could be as short as possible, even sub-micrometer, but practically few tens of centimeters. Like the first optical path 221, the second optical path 222 may be provided by an optical waveguide, e. g. an optical fiber, and/or a free space optical path. A variable optical delay device, an EOM, an AOM, and/or an optical power amplifying element such as EDFA may be provided in the second optical path 222 as well.

Due to the difference of the first and second path lengths l1, l2, the first pulsed split beam 1a is time-delayed relative to the second pulsed split beam 1b. Temporal changes of the repetition rate result in changes of a temporal relationship of the individual pulses of the first and second pulsed split beams 1a, 1b. For employing these changes for a repetition rate control, a timing baseband signal (Sc), based on the time-delayed first pulsed split beam 1a and the second pulsed split beam 1b and representing the mutual time delay fluctuations (i.e., timing jitter) is created with the timing detector device 230. To this end, the first and second pulsed split beams 1a, 1b are superimposed at the timing detector device 230, e. g. by a recombination into a common beam path towards the timing detector device 230 or by directing, e. g. focusing, the first and second pulsed split beams 1a, 1b along separate beam paths to the timing detector device 230.

The timing detector device 230 is an optical intensity cross-correlator (see FIG. 3), including a nonlinear cross correlator crystal 231 such as e. g. Beta barium borate (BBO), potassium titanyl phosphate (KTP), periodically poled potassium titanyl phosphate (PPKTP). Examples and further details of the timing detector device 230 are described below with reference to FIGS. 10 to 12. Furthermore, the timing detector device 230 includes an electro-optical converter 232, that is arranged for converting an optical output of the cross correlator crystal 231 to an electrical signal that provides a base-band signal Sc. The electro-optical converter 232 may be provided by an analog or digital converter, in particular a photodetector, a pair of photodetectors, a balanced photodetector, a pair of photodetectors with analog to digital convertors (ADC) and/or digital to analog convertors (examples, see FIGS. 10 to 12). It is also known in the scientific literature that some optical cross correlators may include internal electro optical convertors (e.g. photodetectors) and not show them separately.

The feedback generation circuit 240 is adapted for generating a feedback signal Sf, based on the base-band signal Sc wherein the feedback signal Sf is coupled to the laser source device 110 for controlling the pulse repetition rate of the pulsed laser beam 1. The feedback generation circuit 240 includes e. g. an analog PID servo controller, a digital PID controller, and/or a digital filter and electronic amplifiers. The output of the feedback generation circuit 240 (i.e., the feedback signal Sf) designed to drive any repetition rate tuning mechanism of the laser, such as an intracavity mirror mounted on PZT, EOM of fiber stretcher etc. contained in the laser source device 110.

The boxes 120, 130 provide possible signal outputs of the pulsed laser oscillator 100. The laser extractor 120 can be provided, wherein the laser output 121 of the pulsed laser oscillator 100 is a divided output of the pulsed laser beam 1 (see also FIG. 8). For example, the laser extractor 120 is the beam splitter device 210, advantageously requiring no extra components. Alternatively or additionally, a microwave extractor 130 can be provided, that is configured for an electronic conversion of the pulsed laser beam 1 into a microwave signal 131. Any microwave extraction scheme from pulsed lasers, e.g., photodetector with microwave bandpass filter and microwave amplifier can be employed. Details of extracting microwave signals are described below with reference to FIGS. 4 to 7.

In operation of the pulsed laser oscillator 100, the output pulsed laser beam 1 of the femtosecond pulsed laser source device 110 is divided (in terms of optical power) into at least two branches. One branch leads to the first optical path 221 (long optical path) which provides the required photonic delay to the optical pulse train. The second branch is the second first optical path 222 providing only a short optical path. These two branches are then combined spatially and temporally inside the optical cross correlator which detects the timing jitter between them. The electro-optical converter 232 converts the optical signal of the cross correlator into the electrical baseband signal Sc. This signal is transferred to the feedback generation circuit 240 (e.g. PID controller) which applies the necessary filter on the electrical signal to generate the feedback signal Sf for the laser to stabilize its pulse repetition rate. A third branch after the laser extractor/optical splitter/coupler 120/210 serves as a simple laser output 121, and a fourth branch can be provided where the laser output can be converted to a microwave signal 131 using the microwave extractor 130. This fourth port has particular advantages for an important application of the invention, involving ultralow noise microwaves.

Figure 2:
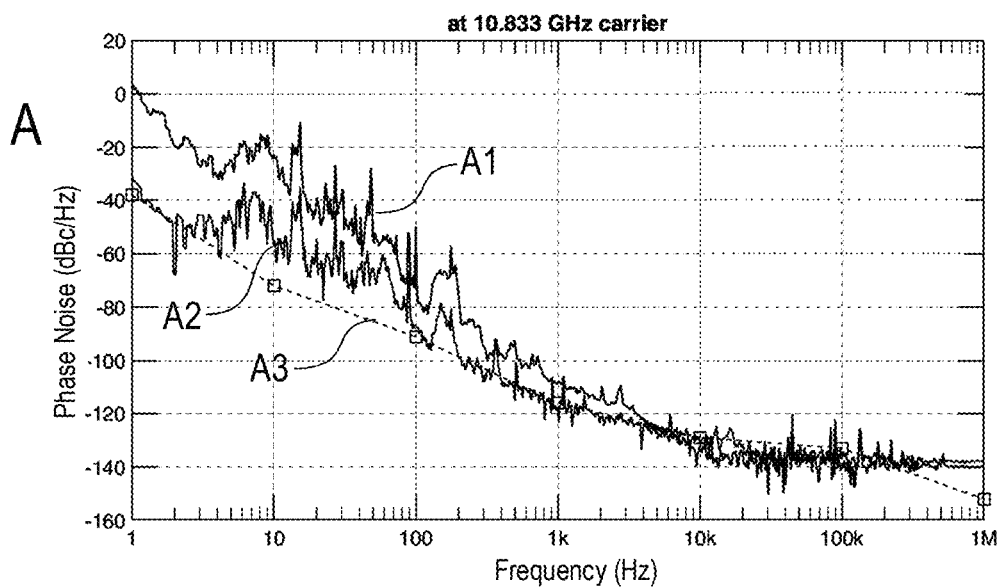
FIG. 2: experimental results illustrating advantages of the inventive pulse repetition rate control.
Figure 2:
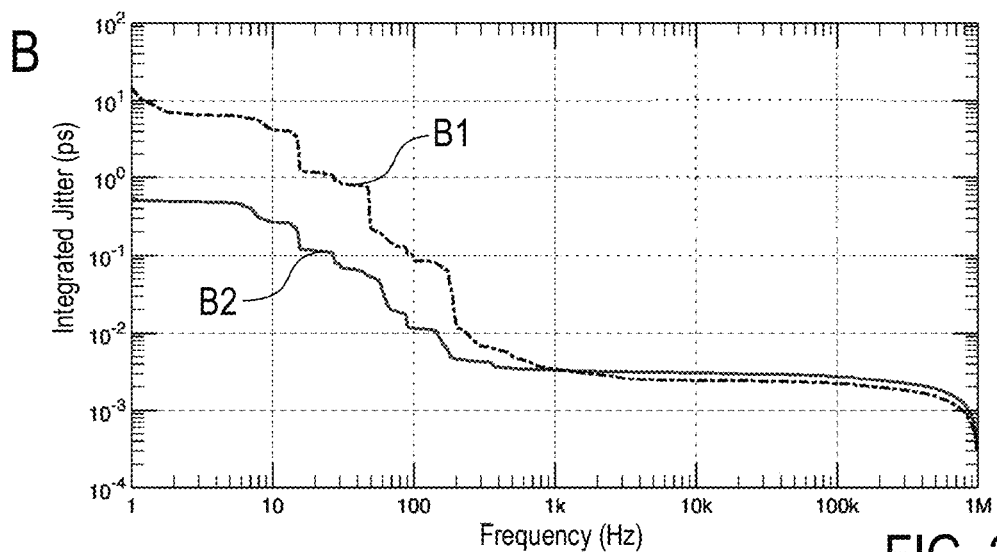

The graphs of FIGS. 2A and 2B show practically measured phase noise data and its integrated timing jitter obtained with a setup according to FIG. 1. With this embodiment of the pulsed laser oscillator 100, a 7-km optical fiber is used as the photonic delay element (first optical path 221) and a balanced optical cross correlator (see FIG. 11) is used with the pulse timing detector device 230. Additionally, a microwave frequency at 10.833 GHz is extracted and a phase noise measurement setup is built in order to assess the performance of pulsed laser oscillator 100. To this end, a photodiode converting the optical pulse train into an electronic pulse train, an electronic bandpass filter to filter the pulse harmonic at 10.833 GHz and a phase noise analyzer are employed.

Curves A1 and B1 show the phase noise of the laser's repetition rate and the integrated timing jitter when the laser is free running (no inventive stabilization, i.e., the feedback signal is not applied), and curves A2 and B2 show the phase noise/timing jitter when the laser is referenced to the 7-km long fiber (i.e., feedback is applied). There is a clear noise reduction for almost all offset frequencies when the laser source device 110 stabilized according to the invention. The phase noise of the self-referenced laser source device 110 is mostly limited by the noise floor (curve A3) of the phase noise measurement setup. This suggests that the actual timing jitter of the self-referenced laser is expected to be lower than the achieved value here.

FIGS. 4 to 7 show further details of embodiments, wherein the inventive pulsed laser oscillator 100 includes the microwave extractor 130 for creating stabilized microwaves 131.

Figure 4:
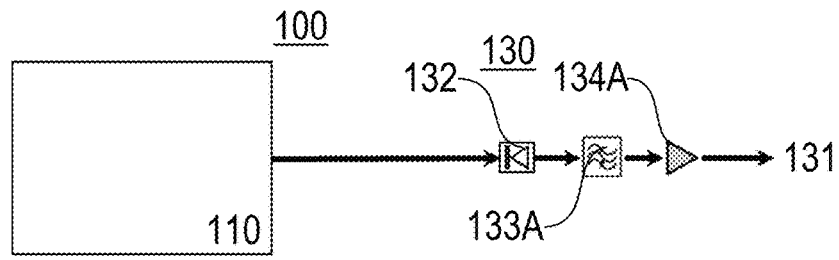
FIGS. 4 to 7: illustrations of creating a microwave output with a pulsed laser beam being stabilized according to the invention.

According to FIG. 4, the microwave extractor 130 includes a photodetector 132, like a photodiode, a first bandpass filter 133A and a first electronic microwave amplifier 134A. Once the optical output of the stabilized laser source device 110 is photodetected, the electronic spectrum at the photodetector output will contain the harmonics of the pulse repetition rate up to the available bandwidth of the photodetector 132. One of the harmonics is filtered out by the first bandpass filter 133A, and amplified to the desired power value and served as the desired microwave output 131.

Figure 5:
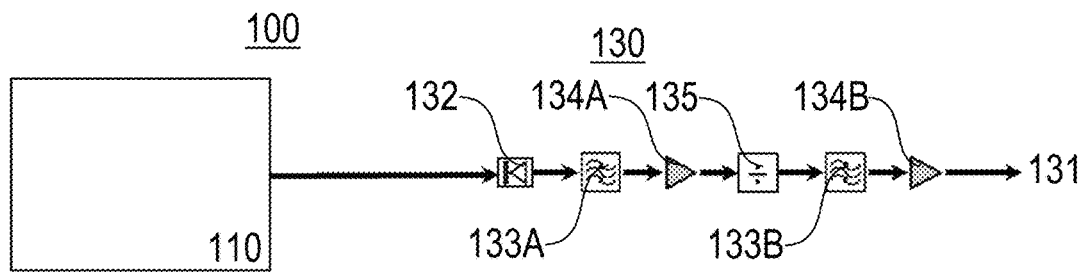

According to a modified variant of FIG. 4, as shown in FIG. 5, the output of the first microwave amplifier 134A can be divided into a frequency of choice with a divider 135 whose output is further filtered with a second bandpass filter 133B and amplified with a second electronic microwave amplifier 134B to give the desired microwave output 131.

Figure 6:
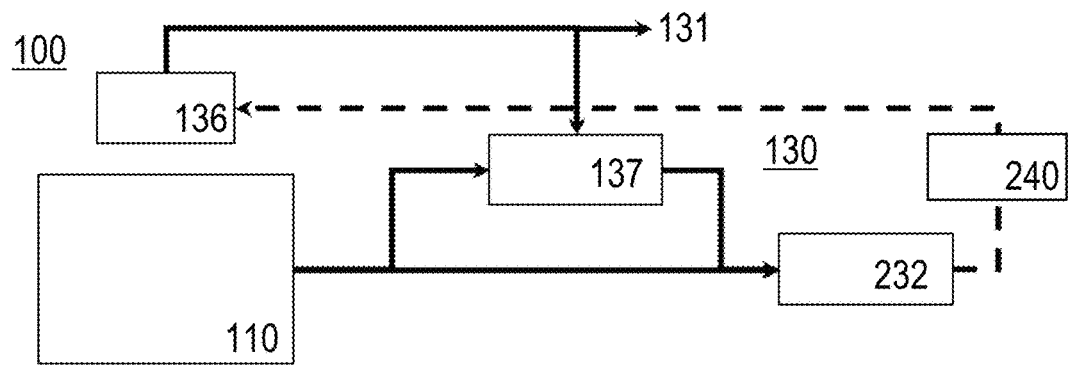

As shown in FIG. 6, the optical output of the stabilized laser source device 110 can be used as an input to a Balanced Optical-Microwave Phase Detector (BOMPD) which will generate a microwave output referenced to the repetition rate of the pulsed laser using its internal VCO circuit 136 (voltage controlled oscillator). To this end, an output of the electro-optical converter 232 (balanced photodetector) of the timing detector device (see FIGS. 1, 3) is processed by a loop filter 240 and then employed as a feedback signal applied to the VCO circuit 136, that provides the microwave output 131 and controls an electro-optical modulator 137 coupled with the balanced photodetector 232. The BOMPD can be configured and operated as described in [13].

Figure 7:
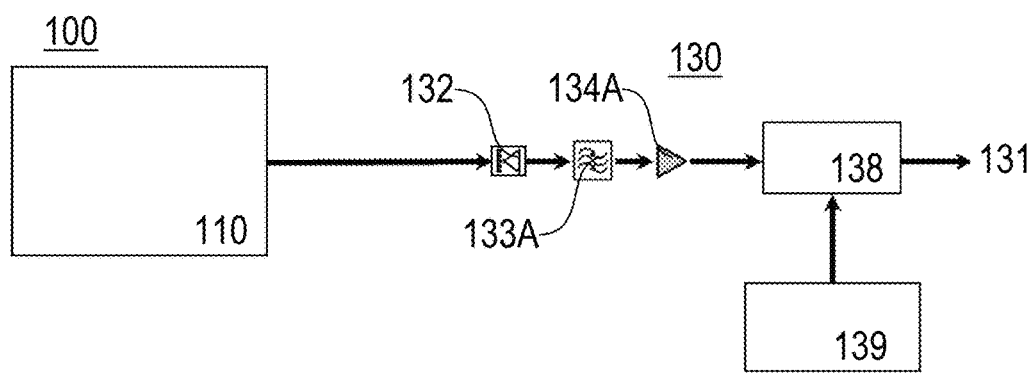

The microwave outputs of the previous schemes of FIGS. 4 to 6 (including the BOMPD approach) can be mixed by an electronic mixer 138 with an output of another tunable microwave source 139 to add another degree of freedom to the tunability of the extracted microwave, as shown in FIG. 7.

FIG. 8 illustrates further embodiments of the pulsed laser oscillator 100 with a repetition rate control apparatus 200 wherein the optical delay device 220 (long path) includes a variable delay stage 223, 224 for adjusting the time delay between the first pulsed split beam 1a and the second pulsed split beam 1b. The variable delay stage comprises variable optical delay elements such as an optical delay line 223 and a fiber stretcher 224. In this way, the repetition rate of the pulsed laser beam 1 of the laser output can be changed or modulated with very high precision. The delay line 223 modulates with a frequency typically <100 Hz, and the fiber stretcher 224 modulates with <50 kHz frequency. If desired, EOM and AOM could be added as well for faster modulation. The variable delay elements could be contained in the short optical path as well.

Here, the first optical path 221 is further provided by a fiber link introducing a long-fixed delay. The fiber link could be any glass optical fiber such as single mode fiber, polarization maintaining single mode fiber, hollow core fiber, or any possible combination of them. The fiber link's dispersion can be compensated with a dispersion compensation element 225 having opposite dispersion properties. The fiber link providing the first optical path 221 could be contained in a compact spool.

FIG. 8 further illustrates that the feedback generation circuit 240 can be provided with a PZT amplifier 241. The PZT amplifier 241 is adapted for amplifying the output of e.g. the PID controller of the feedback generation circuit 240 and provide an amplified feedback signal Sf to drive the PZT element in the laser cavity of the laser source device 110.

Advantageously, varying the delay between the first and second pulsed split beams 1a, 1b provides another degree of freedom to tune the repetition rate besides the intracavity actuators of the laser source device 110. More importantly, this mechanism will allow very high-resolution tuning without interfering with the inventive stabilization scheme. In the following, the effect of changing the delay of variable delay elements on the repetition rate of the laser source device 110, as shown in FIG. 8, is described. Assume the long optical path length is l1 and the short optical path length is l2. Also suppose that every $m^{th}$ pulse from the short path 222 and every $(m-m_1)^{th}$ from the long path 221 meet with each other at the timing detector device 230 (m and $m_1$ are integers). Then, the measured timing by the detector (i.e., $\Delta t$) will be:

$$\Delta t = mT_R - \left[(m - m_1)T_R + \frac{l1 - l2}{c}\right]$$

where $T_R$ is the pulse repetition period and c is the speed of light. When the feedback on the laser repetition rate is turned on, the timing error between the two paths will be set to zero, i.e., Δt=0. Then $$mT_R = mT_R - m_1 T_R + \frac{l1 - l2}{c}$$

$$m_1 T_R = \frac{l1 - l2}{c}$$

$T_R=1/f_R$ is known where $f_R$ is the pulse repetition rate and let's assume l2=0 (i.e., very small):

$$\frac{m_1}{f_R} = \frac{l1}{c}$$

Hence, the pulse repetition rate of the laser will be dependent on the length l1 of the long path:

$$f_R = cm_1 l1^{-1}$$

When the long path is changed by Δl1, the repetition rate will change by:

$$\Delta f_R = -cm_1 l1^{-2} \Delta l1$$

Let's take some typical parameters into consideration: $f_R$=200 MHz, l1=3 km, c=3×10$^8$ m/s and $m_1$=2000. In this case, if the long path is changed by 1.5 cm (i.e., Δl1=1.5 cm), the change in $f_R$ will be:

$$\Delta f_R = -1000 \text{ Hz}$$

In this way, the pulse repetition rate of the laser can be tuned by changing the delay of the long or short path even if the feedback on the laser PZT is actively running.

Another embodiment of the pulsed laser oscillator 100 with the repetition rate control apparatus 200 is illustrated in FIG. 9, wherein the first optical path 221 (long path) is traversed multiple times (i.e., folded). With more details, the first optical path 221 is traveled two times by the first pulsed split beam 1a. With this embodiment, a circulator device 226 is added in the first optical path 221 after the beam splitter device 210 and a back reflector device 227 is added to the end of the first optical path 221 to reflect the light back for the reverse travel. It is noted that the folding factor of the first optical path 221 is not limited to 2. By selecting optical couplers and circulators, the first optical path 221 could be folded for few more times.

The circulator device 226 at the beginning of the long path is configured to transmit the input first pulsed split beam 1a of the laser beam 1 coming from the optical splitter 210 into the long path for forward propagation and to direct the back reflected light upon reverse travel into the timing detector device 230. Such optical circulators are widely used and commercially available, e. g. from manufacturer Thorlabs.

The back reflector 227 could be a simple mirror, or a fiber attached mirror. It could also be a so called Faraday rotating mirror (or: polarization rotating mirror) which rotates the polarization of the light by a certain defined degree (e.g., by 90 degrees) upon back reflection. Faraday rotating mirrors are widely used and commercially available optical components, e. g. from manufacturer Thorlabs. Such a Faraday rotating mirror has advantages in terms of cancelling the polarization mode dispersion of regular single mode fiber if such a fiber used as the fiber link of the first optical path 221.

Figure 11:
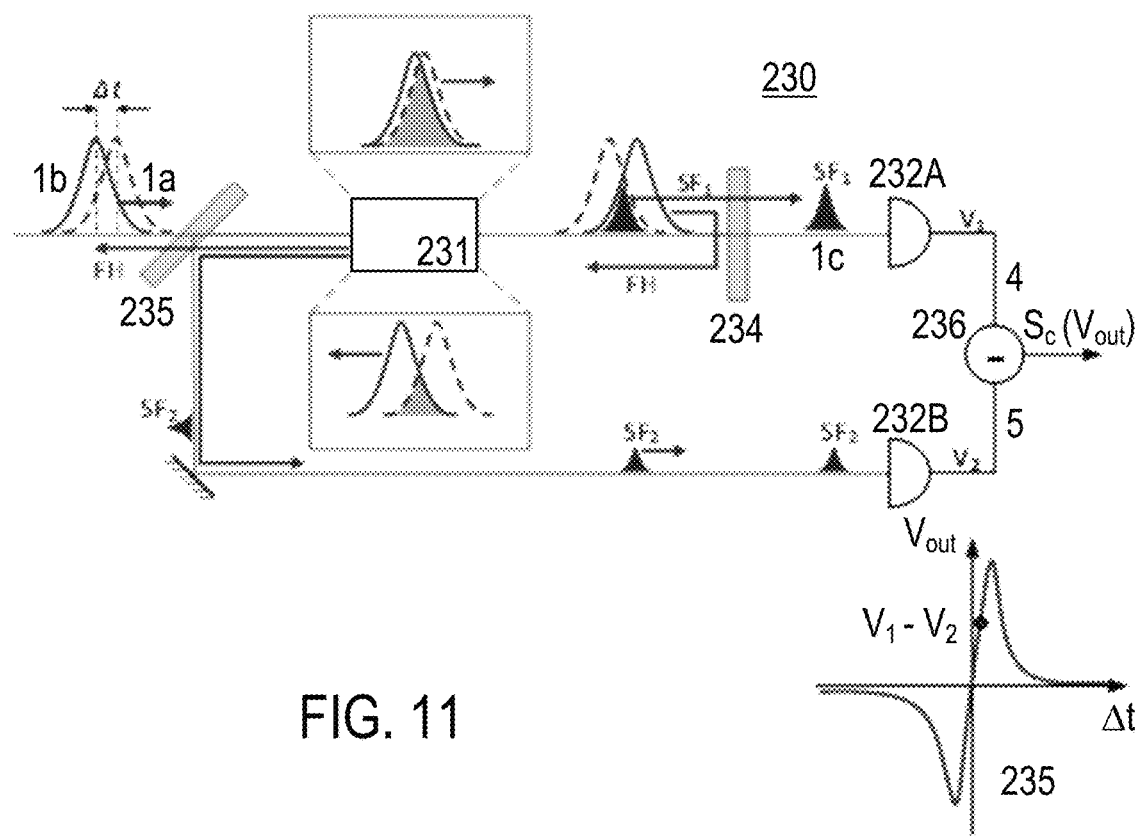
Figure 12:
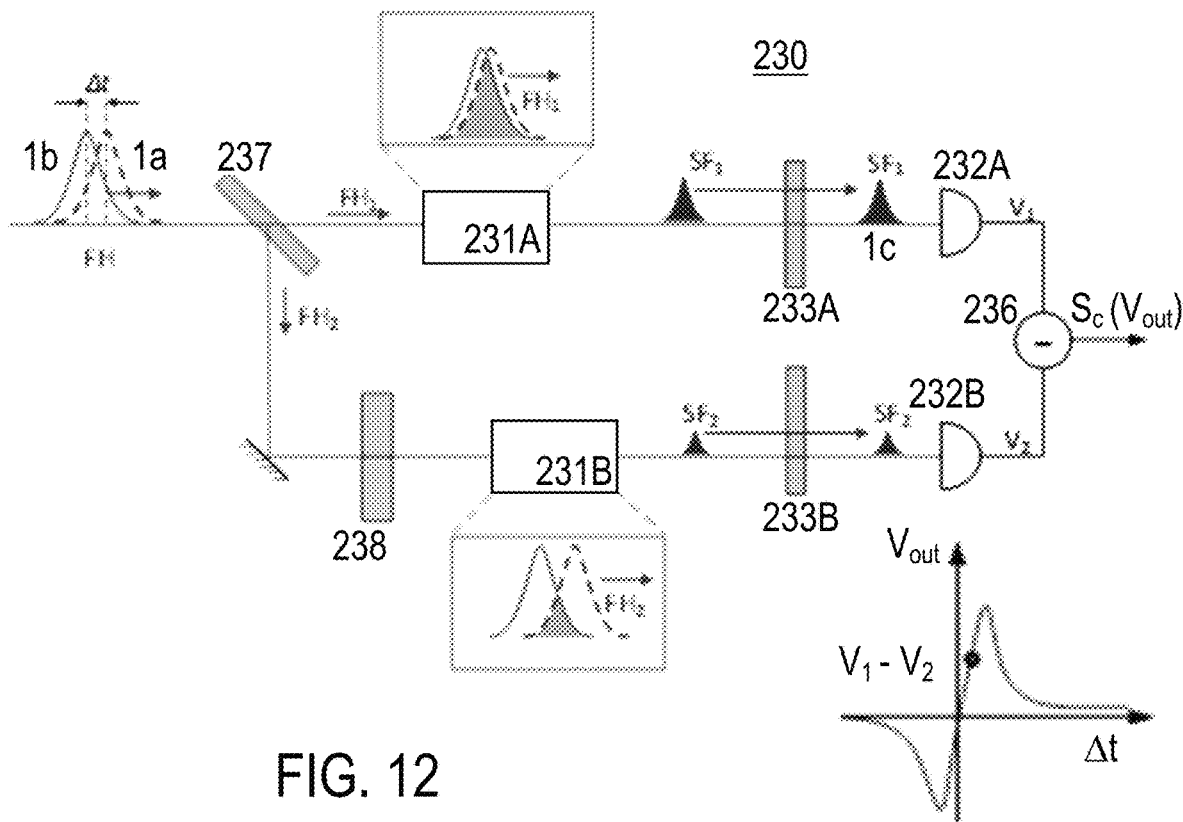

FIGS. 10 to 12 illustrate few possible embodiments of employing an optical intensity cross-correlator for the timing detector device 230 (see FIGS. 1, 3, 8 and 9).

According to FIG. 10, the timing detector device 230 includes an optical cross correlator 231, an optical filter 233 and an electro-optical converter 232, like a photodiode. The first pulsed split beam 1a and the second pulsed split beam 1b (input optical pulse signals) are spatially and temporally overlapped and focused into the optical cross correlator 231, which is e. g. a nonlinear crystal, made of e. g. BBO, KTP, PPKTP, etc. to create a third pulsed beam 1c at the sum frequency of the first and second pulsed split beams 1a, 1b. The pulse amplitude of the pulses of the third pulsed beam 1c depend on the amount of the temporal overlap of the first and second pulsed split beams 1a, 1b. The input optical pulses of the first and second pulsed split beams 1a, 1b are called fundamental harmonics (FH) whereas the generated third pulses 1c are called sum-frequency (SF) pulses. The SF pulse is filtered out from the FH pulses using the optical filter 233 allowing only the SF pulse to pass. The SF pulse is sent on the electro-optical converter 232 which integrates the energy of the SF pulse.

The amount of energy stored in the SF pulse is a function of the temporal overlap or timing of the FH pulses (first and second pulsed split beams 1a, 1b). Therefore, the magnitude of the voltage output integrated by the electro-optical converter 232 is a measure of the timing between the input FH pulses. Hence when the timing of the FH pulses is scanned for instance with optical delay stage on one arm, the output of the photodetector will give a cross-correlation curve similar to the one shown with the insert of FIG. 10.

For avoiding a contamination of the output cross correlator output with the intensity noise of the FH pulses, the modified embodiment of FIG. 11 employs a balanced optical cross correlator (BOC) with a single crystal of the optical cross correlator 231. The balanced optical cross correlator is configured, as described e. g. in [14], for generating two equivalent optical cross correlations with small time delay in between (i.e., delay smaller than the cross-correlation duration) using the "same" input FH pulses. Then, these two cross-correlations are subtracted from each other.

To this end, the optical cross correlator 231 is arranged for a forward pass and a reverse pass. The forward pass is provided as described with reference to FIG. 10, resulting in a first SF pulse SF1 and a first cross correlation signal 4 output ($V_1$) by the first electro-optical converter 232A. The reverse pass is provided by reflecting the FH pulses of the first and second pulsed split beams 1a and 1b with a dichroic reflector 234 back through the optical cross correlator 231. During their reverse pass, the FH pulses generate the second SF pulse ($SF_2$) which is separated from the FH pulses by using another dichroic reflector 235. Then, the $SF_2$ pulses are sent via a separate branch to a second electro-optical converter 232B, resulting in a second cross correlation signal 5 ($V_2$) output by the second electro-optical converter 232B. The difference signal created with the subtraction device 236 is the base-band signal Sc to be obtained.

In this way, the intensity noise of the FH pulses of the first and second pulsed split beams 1a and 1b is suppressed around the middle zero-crossing voltage of the BOC and provides a linear response to the timing of the input FH pulses. The required delay between the cross correlations can be given by a chromatic group delay element such as a simple glass plate in case FH pulses are at different center wavelengths, or by a birefringent element such as the nonlinear crystal itself (e.g., BBO or KTP) in case FH pulses are at the same center wavelength.

Both electro-optical converters 232A, 232B are identical and once their outputs are electronically subtracted, their common electronic noise sources are also suppressed. There are such commercially available photodetector pairs called balanced photodetectors. The insert of FIG. 11 shows a typical BOC output when the timing of the FH pulses is scanned.

As a further alternative, FIG. 12 shows a balanced optical cross correlator with two optical cross correlators 231A, 231B. With this embodiment, the input FH pulses of the first and second pulsed split beams 1a and 1b are divided into two equal parts ($FH_1$ and $FH_2$) in terms of optical power by using 50:50 beam splitter 237 and sent into two separate optical cross correlators 231A, 231B (nonlinear crystals). One of the arms contains a group delay element 238 provided for delaying one cross correlation with respect to the other one. Then, the two SF pulses are filtered by optical filters 233A, 233B and detected by balanced photodetectors 232A, 232B with subsequent subtraction by the subtraction device 236.

Since each cross correlation is performed with the half of the total input power for each pass through one of the optical cross correlators 231A, 231B, the detector output will be lower in this embodiment when compared to the embodiment of FIG. 11 when the input power is the same. The main advantage of the embodiment of FIG. 12 is higher degree of freedom in terms of optical alignment.

An electronic cross-correlation based detection can be implemented by a detection setup (not shown) comprising two electro-optical converters, like photodetectors, each being arranged for detecting one of the first and second pulsed split beams 1a and 1b. The electric output signals of the electro-optical converters are superimposed, e. g. multiplied or added and integrated over a finite time interval for creating a cross-correlation signal as the base-band signal Sc to be obtained.

The features of the invention disclosed in the above description, the drawings and the claims can be of significance individually, in combination or sub-combination for the implementation of the invention in its different embodiments.

What is claimed is:

1. A method for controlling a pulse repetition rate of a pulsed laser beam created by a pulsed laser oscillator, comprising the steps of
    generating the pulsed laser beam by the pulsed laser oscillator,
    splitting the pulsed laser beam into a first pulsed split beam and a second pulsed split beam,
    time-delaying the first pulsed split beam relative to the second pulsed split beam by an optical delay device,
    generating a timing baseband signal including a timing jitter of the pulse repetition rate based on the time-delayed first pulsed split beam and the second pulsed split beam by a timing detector device, which is a correlation detector,
    generating a feedback signal based on the timing baseband signal, and
    applying the feedback signal on the pulsed laser oscillator and controlling the pulse repetition rate of the pulsed laser beam based on the feedback signal.

2. The method according to claim 1, wherein
    the correlation detector comprises at least one of: an electronic cross correlator, a balanced optical cross correlator, and a non-balanced optical cross correlator.

3. The method according to claim 1, wherein
    the pulsed laser oscillator includes a piezoelectric transducer for adjusting a resonator length of the pulsed laser oscillator, and
    the pulse repetition rate of the pulsed laser beam is controlled by providing the feedback signal for the piezoelectric transducer and adjusting the resonator length in dependency on the feedback signal.

4. The method according to claim 1, wherein
    the pulsed laser oscillator includes an optical modulator, which is an electro-optic modulator, for adjusting at least one of a phase, amplitude and polarization of light within the pulsed laser oscillator, and
    the pulse repetition rate of the pulsed laser beam is controlled by providing the feedback signal for the optical modulator and adjusting the at least one of the phase, amplitude and polarization in dependency on the feedback signal.

5. The method according to claim 1, wherein
    the optical delay device includes a variable delay stage which introduces a time delay that effects both of the first and second pulsed split beams through the feedback signal applied on the pulsed laser oscillator, and
    the pulse repetition rate of the pulsed laser beam is set by changing an optical delay provided by the variable delay stage which in turn changes the feedback signal applied to set the pulse repetition rate.

6. The method according to claim 5, wherein the variable delay stage comprises at least one of
    a) at least one mirror on a translation stage,
    b) a fiber stretcher,
    c) an optical modulator,
    d) a variable delay element on chip inscribed in a waveguide, and
    e) a variable delay element based on thermally controlled optical fiber.

7. The method according to claim 1, wherein the timing detector device comprises at least one of the features
    a) the timing detector device comprises at least two photodetectors and an electronic mixer,
    b) the timing detector device is a balanced optical cross correlator,
    c) the timing detector device is a balanced optical cross correlator inscribed in a waveguide,
    d) the timing detector device comprises a non-linear crystal and at least two photodetectors,
    e) the timing detector device comprises a sum frequency generating non-linear crystal and at least two photodetectors, and
    f) the timing detector device is configured to generate a timing baseband signal value of 0 when a pulse of the first pulsed split beam and a pulse of the second pulsed split beam exactly overlap in time.

8. The method according to claim 1, wherein
    the optical delay system comprises a first optical path having a first path length, and a second optical path having a second path length wherein the first pulsed split beam is guided along the first optical path and the second pulsed split beam is guided along the second optical path, and
    the first path length is longer than the second path length.

9. The method according to claim 8, wherein the first path length is
    a) more than 100 m, or
    b) more than 1 km, or
    c) more than 7 km,
    longer than the second path length.

10. The method according to claim 8, wherein the first optical path comprises at least one of
  a) an optical fiber with a length greater than or equal to the first path length,
  b) a multiple-reflection delay line member comprising at least two mirror elements,
  c) a waveguide based delay on a chip,
  d) an optical amplifier,
  e) a dispersion compensation element, and
  f) a reflector.

11. The method according to claim 1, wherein
  the step of generating the feedback signal comprises passing the baseband signal through a loop filter, wherein the timing baseband signal is generated within a linear regime near a zero-point crossing of the timing detector device.

12. The method according to claim 1, wherein
  the method uses only light of the pulsed laser oscillator for controlling the pulse repetition rate.

13. The method according to claim 1, wherein
  the method does not use light of any additional pulsed laser oscillator for controlling the pulse repetition rate.

14. The method according to claim 1, wherein
  the method uses a complete frequency spectrum of the generated pulsed laser beam.

15. The method according to claim 1, comprising at least one of the features
  a) the pulsed laser oscillator is a pulsed femtosecond laser oscillator,
  b) the pulsed laser oscillator is mode-locked,
  c) the pulsed laser beam comprises a pulse train, and
  d) the pulse repetition rate of the pulsed laser oscillator is in a radio frequency range or microwave frequency range.

16. A method for controlling a pulse repetition rate of a pulsed laser beam created by a pulsed laser oscillator, comprising the steps of
  generating the pulsed laser beam by the pulsed laser oscillator,
  splitting the pulsed laser beam into a first pulsed split beam and a second pulsed split beam,
  time-delaying the first pulsed split beam relative to the second pulsed split beam by an optical delay device,
  generating a timing baseband signal including a timing jitter of the pulse repetition rate based on the time-delayed first pulsed split beam and the second pulsed split beam by a timing detector device,
  generating a feedback signal based on the timing baseband signal, and
  applying the feedback signal on the pulsed laser oscillator and controlling the pulse repetition rate of the pulsed laser beam based on the feedback signal, wherein
  the method involves no filtering of the generated pulsed laser beam for controlling the pulse repetition rate.

17. A repetition rate control apparatus being configured for controlling a pulse repetition rate of a pulsed laser oscillator, comprising
  a) a beam splitter device being configured for splitting a pulsed laser beam into a first pulsed split beam and a second pulsed split beam,
  b) an optical delay system being configured for time-delaying the first pulsed split beam relative to the second pulsed split beam,
  c) a timing detector device, which is a correlation detector and is-being configured for generating a timing baseband signal based on the time-delayed first pulsed split beam and the second pulsed split beam, and
  d) a feedback generation circuit for generating a feedback signal, based on the base-band signal, wherein the feedback signal is capable of controlling the pulse repetition rate of the pulsed laser beam.

18. The repetition rate control apparatus according to claim 17, wherein
  the correlation detector comprises at least one of: an electronic cross correlator, a balanced optical cross correlator, and a non-balanced optical cross correlator.

19. A pulsed laser oscillator, comprising a repetition rate control apparatus according to claim 17.

20. The pulsed laser oscillator according claim 19, comprising at least one of
  a) a laser extractor, configured to output the pulsed laser beam, and
  b) a microwave extractor, configured to convert the pulsed laser beam in a microwave beam.

* * * * *